United States Patent
Ueno

(10) Patent No.: US 8,211,241 B2
(45) Date of Patent: Jul. 3, 2012

(54) WASHING DEVICE AND WASHING METHOD FOR SUBSTRATE FOR MAGNETIC RECORDING MEDIUM

(75) Inventor: Satoru Ueno, Chiba (JP)

(73) Assignee: Showa Denko K.K., Tokyo (JP)

( * ) Notice: Subject to any disclaimer, the term of this patent is extended or adjusted under 35 U.S.C. 154(b) by 341 days.

(21) Appl. No.: 12/515,875

(22) PCT Filed: Nov. 27, 2007

(86) PCT No.: PCT/JP2007/072850
§ 371 (c)(1),
(2), (4) Date: May 21, 2009

(87) PCT Pub. No.: WO2008/069051
PCT Pub. Date: Jun. 12, 2008

(65) Prior Publication Data
US 2010/0018558 A1    Jan. 28, 2010

(30) Foreign Application Priority Data

Nov. 28, 2006  (JP) ................................. 2006-319794

(51) Int. Cl.
    *B08B 3/04*  (2006.01)
(52) U.S. Cl. ....... 134/25.4; 134/153; 134/157; 134/902; 211/41.18
(58) Field of Classification Search ............... 134/25.4, 134/153, 157, 902; 211/41.17, 41.18
    See application file for complete search history.

(56) References Cited

U.S. PATENT DOCUMENTS

| | | | |
|---|---|---|---|
| 5,727,582 A | 3/1998 | Terui | |
| 6,199,563 B1 * | 3/2001 | Uehara et al. | ................ 134/25.4 |

FOREIGN PATENT DOCUMENTS

| | | | |
|---|---|---|---|
| JP | 06-031253 A | | 2/1994 |
| JP | 06-060371 A | | 3/1994 |
| JP | 06060371 A | * | 3/1994 |
| JP | 09-300163 A | | 11/1997 |
| JP | 10-242103 A | | 9/1998 |
| JP | 2001-096245 A | | 4/2001 |
| JP | 2001-150336 A | | 6/2001 |
| JP | 2001150336 A | * | 6/2001 |

OTHER PUBLICATIONS

English Machine Translation of JP 06-060371. Translated Jul. 8, 2011.*
English Machine Translation of JP 2001-150336. Translated Jul. 8, 2011.*

* cited by examiner

*Primary Examiner* — Michael Kornakov
*Assistant Examiner* — Nicole Blan
(74) *Attorney, Agent, or Firm* — Sughrue Mion, PLLC

(57) ABSTRACT

A washing device of a substrate for a magnetic recording medium of the present invention includes an immersion tank; a plurality of screw conveyors that are provided in the immersion tank and that hold the substrates for a magnetic recording medium; and a rotation mechanism that causes synchronous rotation of and supports the plurality of screw conveyors, wherein both ends of main shafts of the screw conveyors are provided outside of the immersion tank, the main shafts of these screw conveyors penetrate the tank walls of the immersion tank in a non-contact manner, and the plurality of substrates for a magnetic recording medium that are held by the plurality of screw conveyors are washed by a wet process using a washing liquid that is contained in the immersion tank.

8 Claims, 4 Drawing Sheets

WASHING DEVICE AND WASHING METHOD FOR SUBSTRATE FOR MAGNETIC RECORDING MEDIUM

TECHNICAL FIELD

The present invention relates to a washing device for a substrate for a magnetic recording medium and a washing method using the same.

Priority is claimed on Japanese Patent Application Publication No. 2006-319794, filed Nov. 28, 2006, the content of which is incorporated herein by reference.

BACKGROUND ART

Conventionally, an aluminum substrate or a glass substrate is used as a substrate for a magnetic recording medium that is used in a hard disk drive. Such a substrate is manufactured through various surface treatment steps such as a polishing step on the surface, and after the surface treatment has been performed, a washing device is used to remove dust and the like that has adhered to the surface of the substrate.

As a washing device for a substrate for a magnetic recording medium, there is the example shown for example in Patent Document 1. In this example, a magnetic disk substrate or the like serves as the work, and after performing surface treatment such as a polishing step on the surface, in order to remove foreign matter or the like that adheres to the surface of the work, the works are washed using a liquid while being conveyed with a conveyor in a plurality of washing tanks.

Also, as shown in Patent Document 2, there is a device that washes works such as a substrate for a magnetic recording medium using a washing liquid in a washing tank. In this device, the washing liquid is discharged from the washing tank by causing the washing liquid to overflow.

[Patent Document 1] Japanese Unexamined Patent Application, First Publication No. 2001-96245

[Patent Document 2] Japanese Unexamined Patent Application, First Publication No. H06-31253

DISCLOSURE OF INVENTION

Problems to be Solved by the Invention

In recent years, higher recording density of magnetic recording media has been sought, and in addition to a high degree of flatness being required in order to accommodate the reduction of head flying height over the recording surface of the substrate, an advanced washing technology has been sought in order to remove dust or the like that adheres to the surface of the substrate.

However, in a washing device for a substrate for a magnetic recording medium as mentioned above, wear marks occur at the rotation mechanism portion of a screw conveyor that is provided in the washing tank, particularly the locations of the gears that couple the rotation mechanism portion that is provided inside and outside of the washing tank in order to rotate the screw conveyor and the main shaft of the screw conveyor. Also, in the case of passing the main shaft of the screw conveyor directly to the outside of the washing tank, wear marks occur at the seal portion or the bearing portion of the penetration portion that is provided at the tank wall. For that reason, the problem arises of dust that is generated re-adhering to the substrate.

Also, in order to efficiently cause the dust that has adhered to the substrate for the magnetic recording medium to separate in the washing tank, it is common to apply ultrasonic oscillation or the like, but the screw conveyor that is provided in the washing tank blocks the ultrasonic oscillation or the like that is added from outside the washing tank, and as a result the problem arises of the washing characteristics of the washing device deteriorating.

Therefore, the present invention provides a washing device and a washing method of a substrate for a magnetic recording medium that is capable of efficiently removing dust that has adhered to a substrate for a magnetic recording medium and has a high washing performance with little dust generation in the immersion tank and no re-adhering of dust to the washed substrate compared to a conventional washing device for a substrate for a magnetic recording medium.

Means to Solve the Problems

The present inventors have perfected the present invention as the result of concerted study directed towards eliminating these disadvantages. That is, the present invention is as follows.

(1) A washing device of a substrate for a magnetic recording medium that holds a plurality of substrates for a magnetic recording medium in an immersion tank and washes the substrates for a magnetic recording medium by a wet process using a washing liquid that is contained in the immersion tank, the washing device including a plurality of screw conveyors that hold the substrates for a magnetic recording medium in the immersion tank, wherein both ends of main shafts of the screw conveyors are provided outside of the immersion tank and supported via a rotation mechanism that causes synchronous rotation of the plurality of screw conveyors, with the main shafts of these screw conveyors penetrating the tank walls of the immersion tank in a non-contact manner.

That is, the washing device of a substrate for a magnetic recording medium of the present invention includes:

an immersion tank;

a plurality of screw conveyors that are provided in the immersion tank and that hold the substrates for a magnetic recording medium; and a rotation mechanism that causes synchronous rotation of and supports the plurality of screw conveyors, wherein both ends of main shafts of the screw conveyors are provided outside of the immersion tank, the main shafts of these screw conveyors penetrate the tank walls of the immersion tank in a non-contact manner, and the plurality of substrates for a magnetic recording medium that are held by the plurality of screw conveyors are washed by a wet process using a washing liquid that is contained in the immersion tank.

(2) The washing device of a substrate for a magnetic recording medium according to (1), further comprising an oscillating mechanism outside of the immersion tank that imparts oscillation from outside of the immersion tank to the washing liquid.

(3) The washing device of a substrate for a magnetic recording medium according to (1) or (2), wherein the screw conveyors are provided at positions that do not block the oscillation imparted from outside of the immersion tank to the substrates for a magnetic recording medium.

(4) A washing method of a substrate for a magnetic recording medium, including a step of washing a plurality of the substrates for a magnetic recording medium by a wet process using the washing device of a substrate for a magnetic recording medium according to any one of (1) to (3), wherein during washing of the substrates for a magnetic recording medium, washing liquid is supplied from outside the immersion tank to inside the immersion tank, and the washing liquid in the immersion tank is discharged from penetration positions of the screw conveyor main shafts in the tank walls of the immersion tank.

(5) The washing method for a substrate for a magnetic recording medium according to claim (4), wherein the washing liquid in the immersion tank is moreover discharged from the upper portion of the immersion tank.

(6) The washing method for a substrate for a magnetic recording medium according to (4) or (5), wherein the washing liquid in the immersion tank is supplied from the bottom portion of the immersion tank.

Effects of the Invention

In the above manner, according to the present invention, since the rotation mechanism that causes synchronous rotation of the screw conveyors is provided outside of the immersion tank, and the main shafts of these screw conveyors penetrate the tank walls of the immersion tank in a non-contact manner, the penetration positions of the main shafts of the screw conveyors in the tank walls have a gap. Accordingly, it is possible to prevent the occurrence of wear marks at the contact locations of the rotation mechanism of the screw conveyors and the tank walls. Also, even if the main shafts of the screw conveyors and the tank walls make contact, and dust is generated from the contact locations, since that dust is quickly discharged to the outside of the immersion tank from the penetration positions of the main shafts of the screw conveyors together with the washing liquid, it is possible to raise the washing performance without the dust re-adhering to the substrate for a magnetic recording medium during washing.

In addition, since the oscillating mechanism that imparts oscillation from outside of the immersion tank to the washing liquid is provided, oscillation is imparted to the substrates for a magnetic recording medium that are held in the immersion tank, and there is the effect of dust that has adhered to the substrates for a magnetic recording medium easily coming off.

Also, since the screw conveyors in the immersion tank are provided at positions that do not block the oscillation imparted from outside of the immersion tank to the substrates for a magnetic recording medium, it is possible to efficiently impress the oscillation to the substrates for a magnetic recording medium, and possible to raise the washing performance.

Also, since the washing liquid in the immersion tank is discharged from the penetration positions of the main shafts of the screw conveyors in the immersion tank and discharged from the upper portion of the immersion tank, it becomes easy to maintain the washing liquid surface in the immersion tank at a constant level, and it is possible to prevent the washing liquid surface from falling during washing.

Furthermore, since the washing liquid is supplied from the bottom of the immersion tank and discharged from the penetration positions of the main shafts of the screw conveyors and the upper portion of the immersion tank, it is possible to stably circulate the washing liquid in the immersion tank.

DESCRIPTION OF THE REFERENCE SYMBOLS represents an immersion tank, 23 represents a front wall (tank wall), 24 represents a rear wall (tank wall), 25 represents a side wall (tank wall), 15 represents a discharge port, 38 represents an oscillating mechanism, 50 represents a screw conveyor, 52 represents a screw conveyor body, 54a and 54b represent main shafts, 62 represents a discharge port, 67 represents a groove, 69 represents a gear (rotation mechanism), 70 represents a first gear, and 71 represents a second gear.

BEST MODE FOR CARRYING OUT THE INVENTION

Next, an embodiment of the present invention shall be described based on the drawings.

In the manufacturing process of a substrate W (hereinbelow referred to as a work W) for a magnetic recording medium that is used as a recording medium such as a computer, a washing device is used in a washing step after various surface processing steps, such as a grinding step and polishing step, a sputtering step, a plating step or the like. After washing the work surface by this washing device, by drying the work W in a drying step, the desired work W is obtained.

Figure 1:
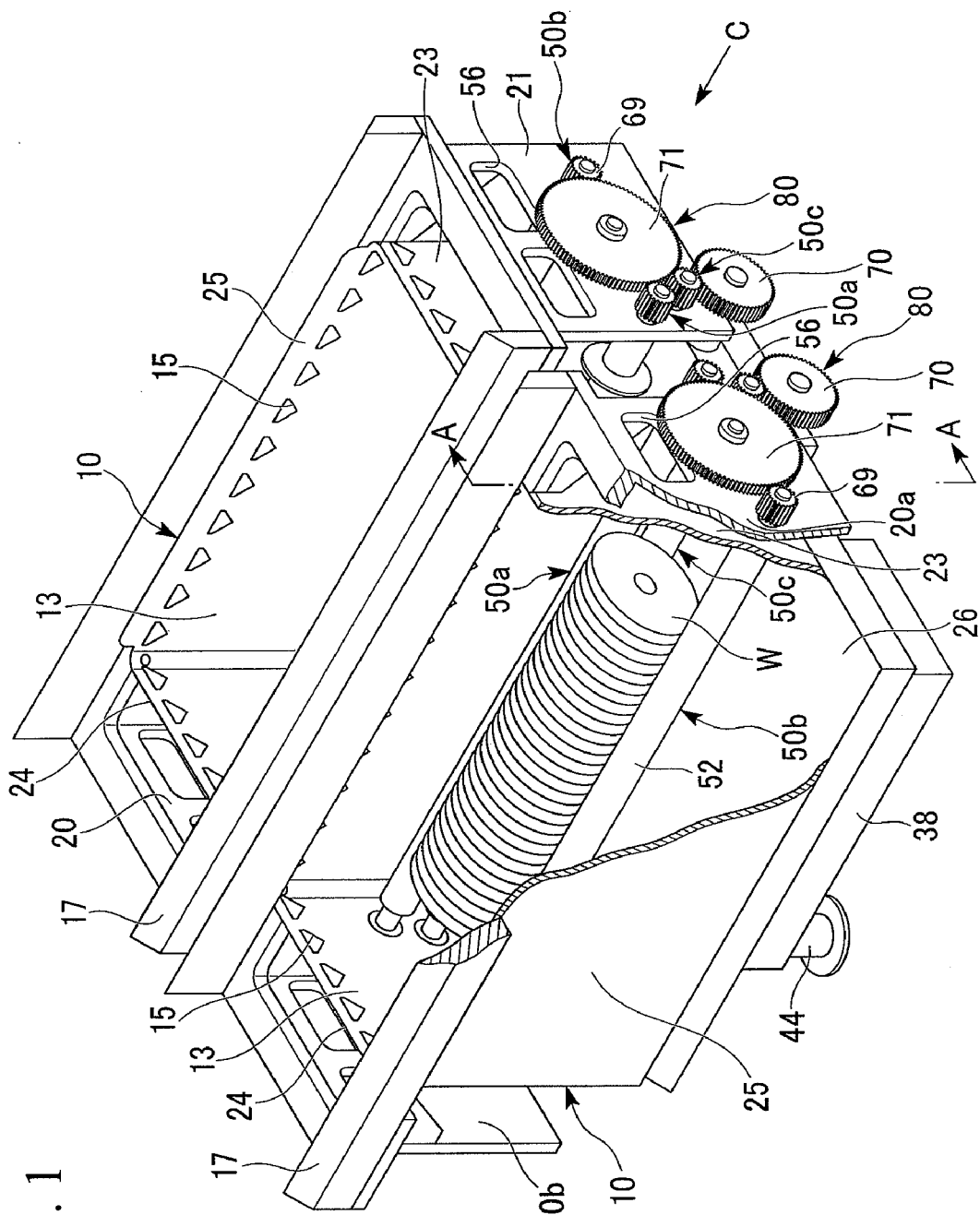
FIG. 1 is a perspective view of the washing device in the embodiment of the present invention.

As shown in FIG. 1, two immersion tanks 10 supported by a frame not shown are arranged in two rows in the washing device. Note that in FIG. 1, an outer tank 46 described below is omitted. Also, since the immersion tanks 10 arranged in two rows are identical members, the description is given with only one row in FIGS. 2 and 3.

The immersion tank 10 has a box shape having an upper opening portion 13, and a washing liquid for washing the work W is contained therein. The immersion tank 10 is provided with a front wall 23 (tank wall) on the carry-in side of a flat and rectangular bottom surface 26, a rear wall 24 (tank wall) on the carry-out side, and side walls 25 and 25 (tank walls) along the lengthwise direction.

A plurality of discharge ports 15 having an approximate triangular shape are provided near the upper edge of the front wall 23, the rear wall 24, and the side walls 25 and 25 of the immersion tank 10. These discharge ports 15 serve to maintain at a constant level the liquid surface of the washing liquid that is contained in the immersion tank 10. An upper frame 17 is attached along the side walls 25 and 25 of the immersion tank 10 at the upper edge of the upper opening portion 13 of the immersion tank 10. A bracket 20a is provided at the front wall 23-side end portion of the upper frame 17. This bracket 20a is an L-shaped member is attached to the lower surface of the upper frame 17 and extends downward parallel to the front wall 23 of the immersion tank 10.

Also, a bracket 20b is provided at the rear wall 24-side end portion of the upper frame 17. This bracket 20b, similarly to the bracket 20a, is an L-shaped member that is attached to the lower surface of the upper frame 17 and extends downward parallel to the rear wall 24 of the immersion tank 10. These brackets 20a and 20b serve to support main shafts 54a and 54b of a screw conveyor 50 described below, and holes 56 are formed in the brackets 20a and 20b to lighten them.

Figure 2:
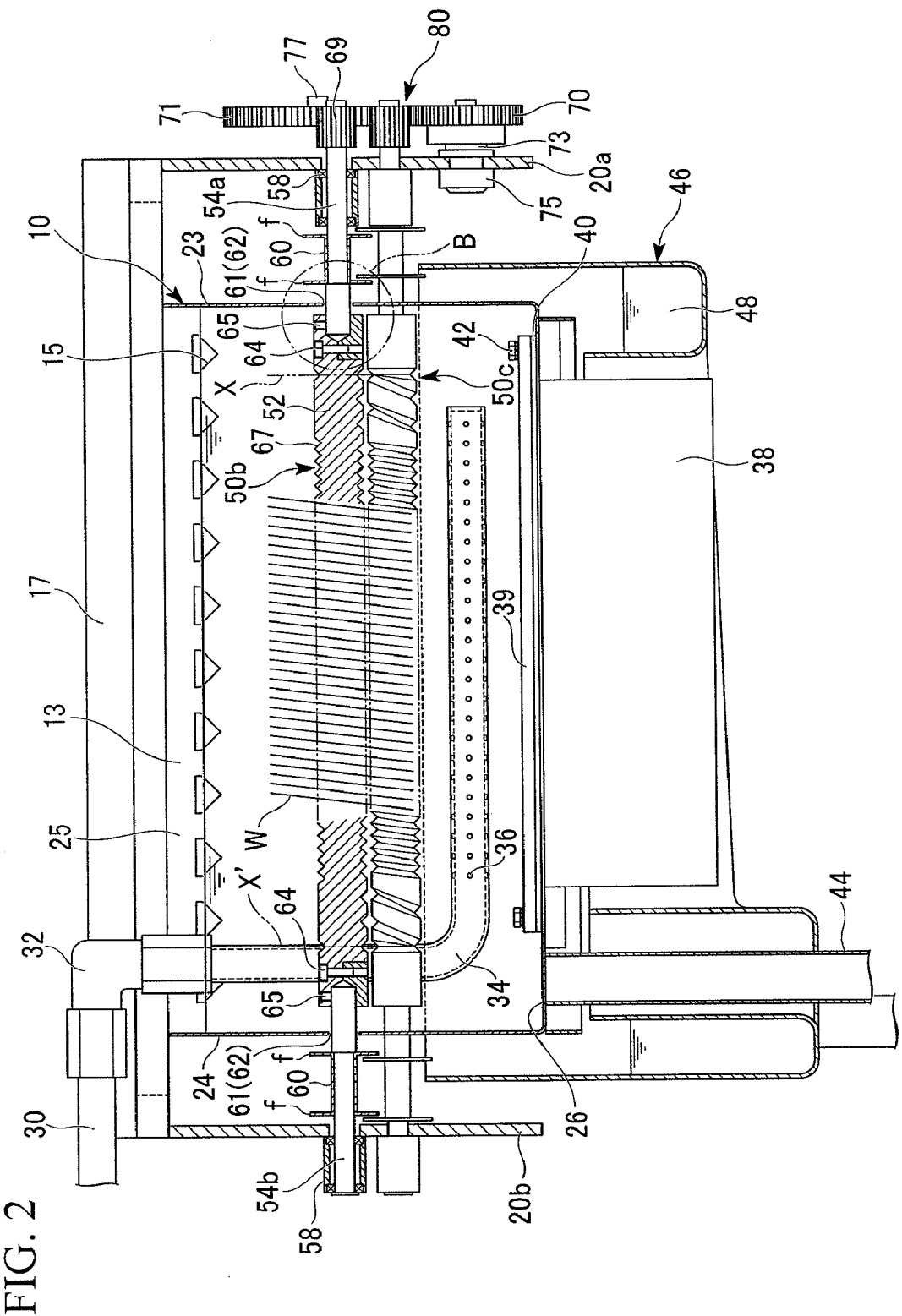
FIG. 2 is a cross-sectional view along the line A-A in FIG. 1.
Figure 3:
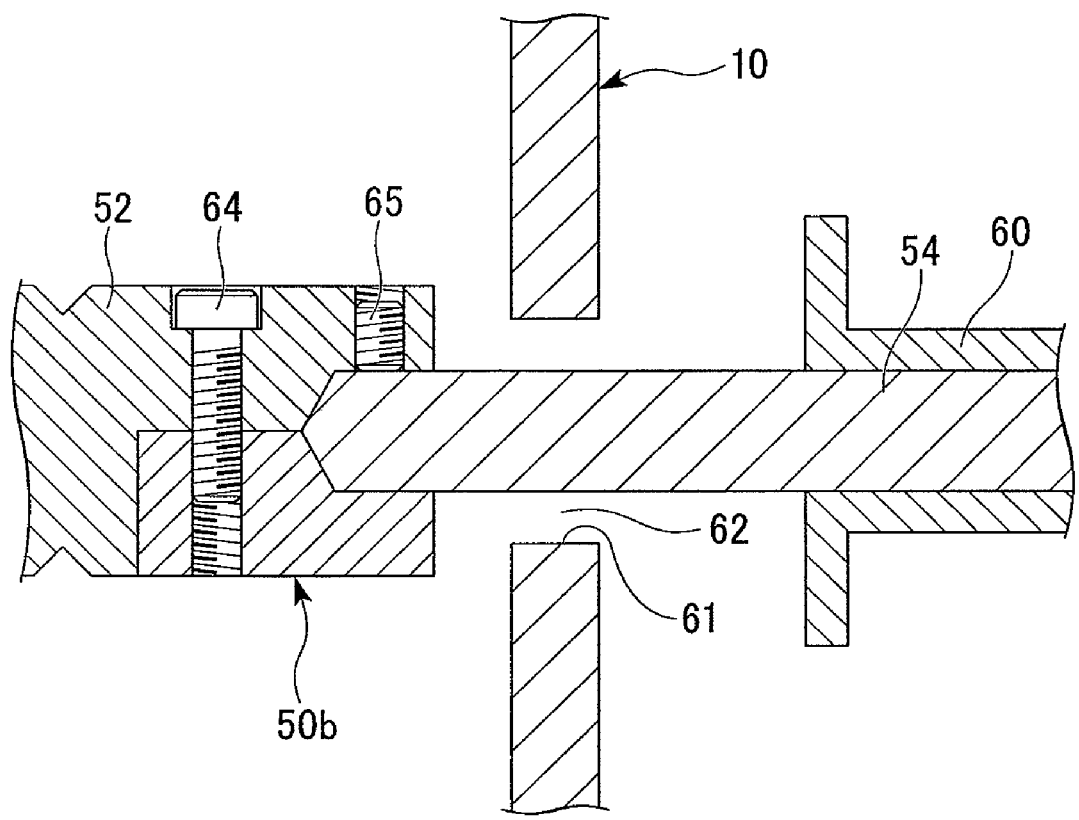
FIG. 3 is an enlarged view of portion B in FIG. 2.

As shown in FIGS. 2 and 3, three screw conveyors 50a, 50b, and 50c are rotatably disposed in a parallel manner along the lengthwise direction of the side walls 25 of the immersion tank 10.

The three screw conveyors 50a, 50b, and 50c is formed of screw conveyors 50a and 50b that support the work W from both sides, and a screw conveyor 50c that is below the screw conveyor 50a and supports the lower side portion of the work W, and so are arranged so as to hold the work W at three locations. Since the screw conveyors 50a, 50b, and 50c are identical members, unless otherwise necessary they shall be referred to as the screw conveyors 50 in the following description.

Each screw conveyor 50 is provided with a screw conveyor body 52 for holding the work W that is carried in from a conveyor mechanism not shown, and main shafts 54a and 54b that support the screw conveyor body 52 at both ends of this screw conveyor body 52.

The one main shaft 54a that is provided on the carry-in side is provided with a gear 69 on one side, and this gear 69 meshes with a first gear 70 and a second gear 71 described below. The main shaft 54a is supported by a bearing 58 that is provided on the inner side of the bracket 20a, and a collar 60 having an H-shape cross section is provided on the inner side of this bearing 58. Here, a flange f is formed at both ends of the collar 60, and one flange f faces a discharge outlet 62 (refer to FIG. 3).

Meanwhile, a hole 61 is formed in the front wall 23 of the immersion tank 10. This hole 61 is formed to be greater than the outer diameter of the main shaft 54a, and the other end side of the main shaft 54a is movably inserted in the hole 61 of the front wall 23. That is, the main shaft 54a penetrates the front wall 23 in a non-contact state. For that reason, a circular gap is formed at the penetration position of the main shaft 54a in the hole 61 of the front wall 23, and this gap is constituted as a discharge port 62 that discharges the washing liquid.

Figure 4:
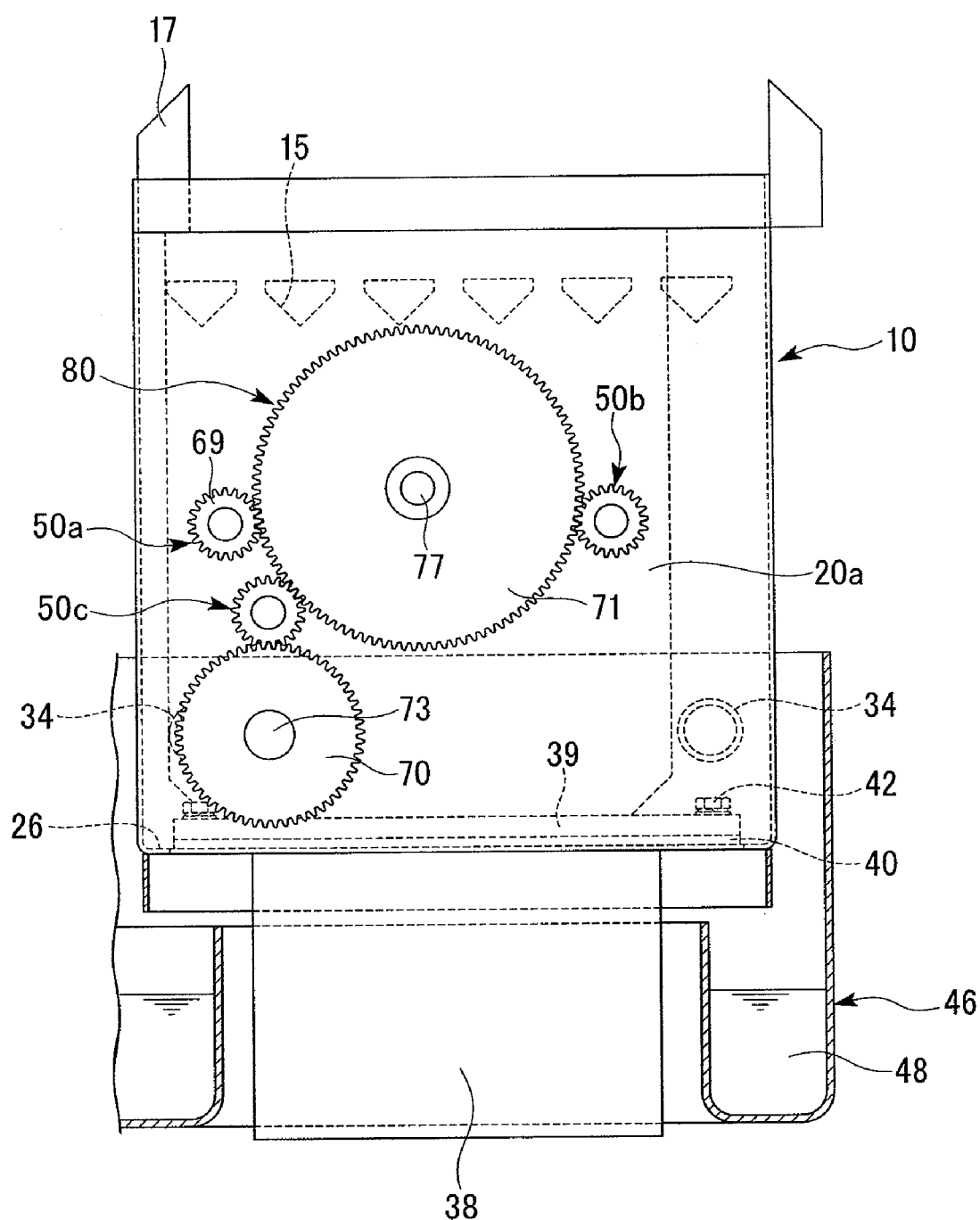
FIG. 4 is a view from arrow C in FIG. 1 that is partially shown by cross section.

As shown in FIG. 4, the first gear 70 is rotatably provided at the lower portion of the bracket 20a. This first gear 70 meshes with the gear 69 of the screw conveyor 50c, and transmits the drive of a motor not shown to the gears 69 and 71. A shaft 73 is provided in this first gear 70, and this shaft 73 is passed through the bracket 20a. This shaft 73 is supported by a bearing 75 that sandwiches the bracket 20a and is provided on the inner side of the bracket 20a (refer to FIG. 2).

The second gear 71 is provided in a rotatable manner in the center of the bracket 20a. A shaft 77 is provided in the second gear 71, and this shaft 77 is passed through the bracket 20a. The shaft 77 is supported by a bearing, not shown, that sandwiches the bracket 20a and is provided on the inner side of the bracket 20a. This second gear 71 is meshed with the gear 69 of each of the three screw conveyors 50, and so by the driving of a motor that is attached to the first gear 70, the three screw conveyors 50 are rotated in synchronization.

A rotation mechanism 80 of the screw conveyors 50 is constituted by these gears 69, 70, and 71, and this rotation mechanism 80 is provided on the outer side of the immersion tank 10.

Returning to FIGS. 2 and 3, the other end of the main shaft 54a is connected to the screw conveyor body 52 in the immersion tank 10. The screw conveyor body 52 is fixed by a bolt 64 so as to support the main shaft 54a by surrounding it, and is fixed in a manner preventing rotation to the main shaft 54a by a locking screw 65. Each screw conveyor body 52 is provided with a spiral groove 67.

This groove 67 serves to support the work W, and the work W, in the state of being supported at three locations by the groove 67 of each screw conveyor body 52, is conveyed to the carry out-side by rotation of the screw conveyor bodies 52. Also, the pitch widens at both ends of the groove 67, and along with a predetermined interval being provided between the works W that are carried in and carried out and the works W that are being washed, are constituted as a carry-in position X and a carry-out position X' of the works W that can perpendicularly support the works W.

The main shaft 54b of the other side that is provided at the carry out side is inserted in the bearing 58 that is provided on the outer side of the bracket 20b, and is supported by this bearing 58. Moreover, a collar 60 having an H-shape cross section is provided on the inner side of this bracket 20b. Here, the flange f that is the same as aforementioned is provided at the collar 60, and one flange f faces the discharge outlet 62 (refer to FIG. 3).

Meanwhile, the hole 61 the same as that in the front wall 23 is formed in the rear wall 24 of the immersion tank 10. This hole 61 is formed to be greater than the outer diameter of the main shaft 54b, and the other end side of the main shaft 54b is movably inserted in the hole 61 of the rear wall 24. That is, the main shaft 54b penetrates the rear wall in a non-contact state. For that reason, a circular gap is formed at the penetration position of the main shaft 54b in the hole 61 of the rear wall 24, and this gap is constituted as the discharge port 62 that discharges the washing liquid.

The other end of the main shaft 54b is connected to the screw conveyor body 52 in the immersion tank 10, similarly to the main shaft 54a.

Above the rear wall 24 side of the immersion tank 10, a supply pipe 30 that supplies the washing liquid to the immersion tank 10 is provided at a position adjacent to the upper frame 17. One end of this supply pipe 30 is connected to a washing liquid tank that is not shown, while the other end is connected to one end of a union elbow 32.

A discharge pipe 34 is connected to the other end of the union elbow 32. This discharge pipe 34 is an L-shaped member that extends downward along the rear wall 24, bends along the bottom surface 26 of the immersion tank 10, and extends in the lengthwise direction of the immersion tank 10. This discharge pipe 34 discharges the washing liquid that is supplied from the washing liquid tank from the bottom portion of the immersion tank 10, and discharge holes 36 are formed in a radial pattern along the circumference of the discharge pipe 34. The supply pipe 30 and union elbow 32, and the discharge pipe 34 are provided in two rows along both side walls 25 and 25 of the immersion tank 10 (refer to FIG. 4).

An oscillating mechanism 38 is provided at the middle portion of the bottom surface 26 of the immersion tank 10. This oscillating mechanism 38 imparts ultrasonic oscillation to the washing liquid that is contained in the immersion tank 10, and a flange portion 39 is provided on the upper portion. The oscillating mechanism 38 is fixed by attaching this flange portion 39 to an attachment opening portion at the bottom surface 26 of the immersion tank 10 with a plurality of bolts 42 in a manner sandwiching a seal material 40. The works W are positioned above the oscillating mechanism 38, and members such as the screw conveyors 50 and the discharge pipe 34 do not exist between the oscillating mechanism 38 and the works W, so that the oscillation generated by the oscillating mechanism 38 is transmitted to the washing liquid, and directly impressed on the works W (refer to FIG. 4).

A drain pipe 44 that is continuous with the inside of the immersion tank 10 is provided laterally with the rear wall 24 side of the oscillating mechanism 38. This drain pipe 44 serves to discharge the washing liquid in the immersion tank 10 from the bottom surface 26 of the immersion tank 10 downward of the immersion tank 10, and is connected to a drain tank, not shown, that stores the discharged washing liquid.

Also, an outer tank 46 is provided at the bottom portion of the immersion tank 10 so as to cover from the outer side a portion (the flange f) of the collar 60 of the screw conveyor 50 from the bottom portion of the immersion tank 10. This outer tank 46 serves to receive the washing liquid that is discharged from the discharge ports 15 of the immersion tank 10 and led downward along the front wall 23, the rear wall 24, and the side walls 25 and 25, and the washing liquid that is discharged from the discharge port 62 and led downward by the flange f, and the circumference of the immersion tank 10 is constituted as a storage portion 48 that stores the discharged washing liquid. The outer tank 46 is supported by the aforementioned frame not shown, and the surface that is positioned under the bottom surface 26 of the immersion tank 10 inclines toward the storage portion 48 that is provided at the circumference.

A carry-in mechanism, not shown, is provided on the carry-in side of the immersion tank 10. This carry-in mechanism places the works W, which have passed through the surface treatment process, one at a time on the carry-in position X of the screw conveyor 50 described below (refer to FIG. 2). Also, a carry-out mechanism, not shown, is provided on the carry-out side of the immersion tank 10. This carry-out mechanism holds the works W that have been conveyed to the carry-out position X' one at a time, and conveys them to a drying device at a later stage of the washing device.

The operation shall next be described.

First, the work W is conveyed to the inside of the immersion tank 10 in which the washing liquid is contained. Specifically, the work W that has been subjected to surface treatment is placed at the carry-in position X on the screw conveyors 50 by the carry-in mechanism (refer to FIG. 2). Then, the work W that has been carried into the immersion tank 10 is conveyed to the carry-out side on the screw conveyor body 52 by synchronous rotation of the rotation mechanism 80 of the screw conveyors 50. Normally, 20 to 100 works W are placed on the screw conveyors 50 in accordance with the washing time.

Ultrasonic oscillation from the oscillating mechanism 38, which is provided at the bottom surface 26 of the immersion tank 10, is impressed on the surface of the conveyed works W, and dust that has adhered to the works W is thereby removed. The removed dust remains in the washing liquid in the immersion tank 10.

Here, since the main shafts 54a and 54b of the screw conveyors 50 penetrate the front wall 23 and the rear wall 24 of the immersion tank 10 in a non-contact state, and the discharge ports 62 are formed here, the dust that accumulates in the washing liquid in the immersion tank 10 is discharged so as to leak out together with the washing liquid from the discharge ports 62. This discharged washing liquid is stored in the storage portion 48 of the outer tank 46 that is provided so as to cover the bottom portion of the immersion tank 10. Moreover, even if the discharged washing liquid spreads along the main shafts 54a and 54b of the screw conveyors 50, it is held back by the flange f of the collar 60 that is provided on the main shafts 54a and 54b, and thereby is led to drip downward to the storage portion 48.

The dust that accumulates on the surface of the washing liquid is discharged from the discharge ports 15 that are provided in the front wall 23, the rear wall 24, and the side walls 25 and 25 of the immersion tank 10. Moreover, since these discharge ports 15 are formed in an approximate triangular shape, as the surface of the liquid rises, the flow amount to be discharged increases.

Replenishment of the discharged washing liquid is supplied from the discharge holes 36 of the discharge pipe 34 that is arranged along the bottom surface 26 of the immersion tank 10. The washing liquid that is discharged in a radial pattern from the discharge holes 36 circulates in the immersion tank 10, and is again discharged from the discharge ports 15 and the discharge ports 62.

The works W that have been conveyed on the screw conveyors 50 until the carry-out side are extracted one at a time by the carry-out mechanism, not shown, at the carry-out position X' (refer to FIG. 2), and upon being conveyed to the drying device not shown, are subjected to the drying process.

EXAMPLES

Next, the washing device of the present invention shall be described in greater detail with an embodiment. Note that the present invention is not limited to the content of the following embodiment.

Here, 250 works were washed using the washing device of the present invention under the following conditions. The work surface after washing was checked with 100 differential interference contrast microscopes. The washing conditions were as follows.

Work: a substrate for a 2.5-inch magnetic recording media formed of a disk-shaped aluminum alloy with an outer diameter of 65 mm, an inner diameter of 20 mm, and a thickness 0.8 mm.

Immersion tank dimensions: length of approximately 500 mm, depth of approximately 200 mm, and height of approximately 200 mm, and capable of allowing placement of approximately 30 of the aforementioned works.

Washing liquid: pure water
Ultrasonic oscillation: 200 kHz, 500 W
Washing time: 10 minutes As a result of carrying out washing under the above conditions, no extraneous matter was observed on the work surface, and a high washing performance was obtained.

Accordingly, according to the above-mentioned embodiment, a constitution is achieved in which, together with the rotation mechanism 80 that causes synchronous rotation of the screw conveyors 50 being provided on the outer side of the immersion tank 10, the main shafts 54a and 54b of the screw conveyors 50 penetrate the front wall 23 and the rear wall 24 of the immersion tank 10 in a non-contact state, and the discharge ports 62 are provided at the penetration positions thereof. Accordingly, it is possible to prevent the occurrence of wear marks at the rotation mechanism 80 and the contact locations of the main shafts 54a and 54b and the front wall 23 and rear wall 24. Also, even if the main shafts 54a and 54b of the screw conveyors 50 and the front wall 23 and rear wall 24 make contact and dust is generated from those contact locations, since that dust is quickly discharged to the outside of the immersion tank 10 from the discharge ports 62 of the main shafts 54a and 54b of the screw conveyors 50 together with the washing liquid, it is possible to raise the washing performance without the dust re-adhering to the work W during washing.

Also, since the oscillating mechanism 38 that imparts oscillation to the washing liquid is provided on the outer side of the immersion tank 10, there are the effects of the oscillation being imparted to the works W that are held in the immersion tank 10, and the dust that has adhered to the work W surface easily coming off.

Moreover, since the screw conveyors 50 in the immersion tank 10 are provided at positions that do not block the oscillation imparted from the bottom of the immersion tank 10 to the works W, it is possible to efficiently impress the oscillation on the works W and possible to raise the washing performance.

Also, in addition to discharging the washing liquid in the immersion tank 10 from the discharge ports 62 of the main shafts 54a and 54b of the screw conveyors 50 in the front wall 23 and the rear wall 24 of the immersion tank 10, since it is discharged from the discharge ports 15 that are provided at the upper portion of the immersion tank 10, it is possible to maintain the washing liquid surface at a constant level in the immersion tank 10, and possible to prevent the washing liquid surface from falling during washing.

In addition, since the washing liquid in the immersion tank 10 is supplied from the discharge pipe 34 that is provided along the bottom surface 26 of the immersion tank 10, the washing liquid that is supplied from the bottom of the immersion tank 10 comes to be discharged from the discharge ports 62 that are provided at the penetration positions of the main shafts 54a and 54b of the screw conveyors 50 that are provided in the vicinity of the center portion of the immersion tank 10 and the discharge ports 15 that are provided at the upper portion of the immersion tank 10, and so it is possible to stably circulate the washing liquid in the immersion tank 10.

Note that the technical scope of the present invention is not limited to the preferred embodiment of the invention has been described and illustrated above, and includes various modifications to the abovementioned embodiment within the scope that does not depart from the spirit or scope of the present invention. For example, in the abovementioned embodiment, it was described how the works W are carried into the immersion tank one at a time and carried out one at a time, but it is possible to have a constitution that carries in a plurality at a time and carries out a plurality at a time.

INDUSTRIAL APPLICABILITY

According to the present embodiment, it is possible to prevent the occurrence of wear marks of contact locations at the rotation mechanism of the screw conveyors and the tank walls. Also, even if the main shafts of the screw conveyors and the tank walls make contact, and dust is generated from the contact locations, since that dust is quickly discharged to the outside of the immersion tank from the penetration positions of the main shafts of the screw conveyors together with the washing liquid, it is possible to raise the washing performance without the dust re-adhering to the substrate for a magnetic recording medium during washing. Thus, the present invention has industrial applicability.

The invention claimed is:

1. A washing device of a substrate for a magnetic recording medium that holds a plurality of substrates for a magnetic recording medium in an immersion tank and washes the substrates for a magnetic recording medium by a wet process using a washing liquid that is contained in the immersion tank,
   the washing device comprising a plurality of screw conveyors that hold the substrates for a magnetic recording medium in the immersion tank, wherein
   both ends of main shafts of the screw conveyors are provided outside of the immersion tank and supported via a rotation mechanism that causes synchronous rotation of the plurality of screw conveyors, with the main shafts of these screw conveyors penetrating the tank walls of the immersion tank in a non-contact manner.

2. The washing device of a substrate for a magnetic recording medium according to claim 1, further comprising an oscillating mechanism outside of the immersion tank that imparts oscillation from outside of the immersion tank to the washing liquid.

3. The washing device of a substrate for a magnetic recording medium according to claim 2, wherein the screw conveyors are provided at positions that do not block the oscillation imparted from outside of the immersion tank to the substrates for a magnetic recording medium.

4. A washing method of a substrate for a magnetic recording medium, comprising a step of washing a plurality of the substrates for a magnetic recording medium by a wet process using the washing device for a substrate for a magnetic recording medium according to claim 1, wherein
   during washing of the substrates for a magnetic recording medium, a washing liquid is supplied from outside the immersion tank to inside the immersion tank, and
   the washing liquid in the immersion tank is discharged from penetration positions of the screw conveyor main shafts in the tank walls of the immersion tank.

5. The washing method of a substrate for a magnetic recording medium according to claim 4, wherein the washing liquid in the immersion tank is moreover discharged from the upper portion of the immersion tank.

6. The washing method of a substrate for a magnetic recording medium according to claim 4, wherein the washing liquid in the immersion tank is supplied from the bottom portion of the immersion tank.

7. The washing device of a substrate for a magnetic recording medium according to claim 1, wherein flanges are formed on the main shafts of the screw conveyors.

8. The washing device of a substrate for a magnetic recording medium according to claim 7, further comprises an outer tank which is provided outside of the immersion tank and covers the flanges and the bottom portion of the immersion tank.

* * * * *